United States Patent
Cohen

(10) Patent No.: US 6,600,409 B2
(45) Date of Patent: **\*Jul. 29, 2003**

(54) SIGNALING SELF-CONTAINED ADD-ON ACCESSORY FOR AN ANALOG METERING DEVICE SUCH AS A SPEEDOMETER AND SECONDARY DEVICE

(76) Inventor: Marc S. Cohen, 4850 W. Morse, Lincolnwood, IL (US) 60712

(\*) Notice: Subject to any disclaimer, the term of this patent is extended or adjusted under 35 U.S.C. 154(b) by 0 days.

This patent is subject to a terminal disclaimer.

(21) Appl. No.: 09/906,329

(22) Filed: Jul. 16, 2001

(65) Prior Publication Data

US 2003/0011470 A1 Jan. 16, 2003

(51) Int. Cl.⁷ .................................................. B60Q 1/00
(52) U.S. Cl. .................... 340/425.5; 340/438; 340/441; 340/466; 340/936; 116/62.3; 116/74
(58) Field of Search ............................. 340/425.5, 438, 340/441, 459, 460, 461, 466, 467, 457, 539, 936; 307/9.1, 10.1; 116/28 R, 37, 43, 46, 57, 62.3, 74, 284, 292; 701/70, 79, 93, 110

(56) References Cited

U.S. PATENT DOCUMENTS

| | | | |
|---|---|---|---|
| 3,980,041 A | 9/1976 | Evans | 116/62.3 |
| 4,095,553 A | 6/1978 | Ono et al. | 116/62.3 |
| 4,308,527 A | 12/1981 | Moreau et al. | 340/815.4 |
| 4,633,803 A | 1/1987 | Flowers | 116/334 |
| 5,554,970 A | 9/1996 | Mottahedeh | 340/441 |
| 6,310,544 B1 * | 10/2001 | Cohen | 340/438 |

\* cited by examiner

*Primary Examiner*—Toan Pham
(74) *Attorney, Agent, or Firm*—Greer, Burns & Crain, Ltd.

(57) ABSTRACT

A self-contained accessory for an analog metering device such as a speedometer or tachometer. The accessory includes a sensor which is selectively adjustable to align with a plurality of positions in the range of movement of an output needle of the analog metering device. In the preferred embodiment, the sensor is alignable with gradation marks, e.g., miles per hour indicia on a speedometer, and the accessory provides a signal when a needle reaches a selected gradation. The signal is sent to a secondary device, such as a radar detector or central monitoring system. The signal may also be used to provide an indication that alerts a user that a selected gradation has been reached by an output needle of the analog metering device. The accessory attaches to a cover of the analog metering device and allows adjustment of sensor position without removal of the accessory from the cover. A preferred radar detector uses the signal to effect a modified operation where some functions of the radar detector are responsive to the signal of the accessory.

14 Claims, 3 Drawing Sheets

SIGNALING SELF-CONTAINED ADD-ON ACCESSORY FOR AN ANALOG METERING DEVICE SUCH AS A SPEEDOMETER AND SECONDARY DEVICE

FIELD OF THE INVENTION

The present invention generally concerns analog metering devices having moving needles. The invention is particularly suitable as an add-on accessory to a speedometer or a tachometer. The invention also concerns secondary devices that rely upon or may use information obtained from an add-on accessory monitoring a set critical value of an analog metering device. Another field of the invention is radar detectors that monitor radar for use in motor vehicles.

BACKGROUND OF THE INVENTION

Speedometers, tachometers, and similar devices provide critical information to drivers of motor vehicles. Use of the information provided by such an instrument, however, requires an operator to divert attention away from the environment in which the vehicle is being operated. Although only momentary, it is better that an operator rarely, if ever, need to divert attention away from the environment since reference of the environment surrounding the motor vehicle is critical to safety of operation.

Various devices have been previously developed to address this general concern. Cruise control, for example, automatically regulates the speed of a vehicles operation to a desired speed. Operation of the cruise control requires at least one glance away from the environment to set the desired speed. In addition, cruise control has limited utility in situations involving significant traffic where a steady cruising speed cannot be obtained. A head-up display is another effort to provide drivers information without requiring a diversion of attention away from the environment. These displays have found limited acceptance and use in practice, though. These two techniques also represent techniques which typically must be installed as original equipment, or added on at significant expense. This further limits their application in practice. Radar detectors notify drivers of the potential for detection by radar, which may cause drivers to pay more attention to the speed display used in a vehicle. This similarly causes a look away from the environment. In addition, the radar detector becomes an additional distraction if the vehicle speed is below a legal speed limit since the information provided by the radar detector in that case is irrelevant.

U.S. Pat. No. 3,980,041 to Evans seeks to provide an add-on speedometer speed warning indicator which could be applied to the clear cover of a speedometer without disassembly of the speedometer. The Evans device is a plastic plate which adheres to the cover of a speedometer such that once a critical speed is reached further acceleration of the vehicle will cause the needle in the speedometer to be hidden from view. Though this device obviates the need to disassemble a speedometer for use of the device, it fails to solve the problem of diverting an operator's attention away from the vehicle's operating environment. In addition, adjustment of the device is rather cumbersome since it requires removal of a plate and replacement with a differently configured, recut or repositioned plate.

Thus, there is a need for an add-on accessory which alerts an operator or a secondary device when a critical value is indicated by the output of an analog metering device without requiring the operator to look at the analog meter. Such an add-on accessory should be adjustable so that the operator may readily and conveniently select a desired critical value. Such a device is provided by the present invention.

SUMMARY OF THE INVENTION

The present invention is a self-contained accessory for an analog metering device such as a speedometer or tachometer. The accessory mounts to the clear cover of a metering device through adhesive, suction, or other suitable means. The accessory includes a selectively adjustable sensor which can be moved to a plurality of positions corresponding to operational positions of the needle of the analog metering device. A user or another device aligns the sensor with one of the gradation marks of the metering device. A signal is generated when the needle becomes aligned with the sensor. The signal is transmitted to a secondary device separate from the device, and it may also be used to generate an alarm signal. An exemplary secondary device is a radar detector such as might be used in a motor vehicle. Another exemplary secondary device is central monitoring system that might be used to collect information concerning critical values for an analog meter in an industrial setting. The generated signal also might be used to generate an alarm, preferably housed in the self-contained accessory.

The housing for the accessory is small enough that it doesn't obscure the information contained on the face of the metering device. The housing includes a power source and the alarm which is responsive to the sensor. Preferably, the sensor is mounted on a rotationally adjustable arm that extends from the housing. In the preferred embodiment, the signal generated is transmitted wirelessly to a remote secondary device, e.g., a radar detector or central monitoring system.

A radar detector as a secondary device cooperating with an add-on accessory of the invention may use the signal to activate. In general, the radar detector uses the signal to effect a modified operation where at least some functions of the radar detector are responsive to the signal of the accessory. The radar detector is conventional, but is modified to use the signal to, for example, enable its alarm response from an alarm circuit or enable its detection function from a detection circuit. This can provide a method by which the radar detector conserves power and provides no irritating false alarms when vehicle speed is below a critical value. The radar detector would also have reduced susceptibility to VG-2 detection, which is used to identify the use of radar detectors. Such a radar detector or alternate secondary device, modified to accept and make use of a signal from an add-on accessory of the invention forms a second aspect of the invention.

BRIEF DESCRIPTION OF THE DRAWING

Other features, objects and advantages of the invention will be apparent to those skilled in the art by reference to the detailed description and the drawing figure.

DETAILED DESCRIPTION OF THE INVENTION

The accessory of the invention is self-contained and is affixed to the cover of an analog metering device such as a speedometer or tachometer. The description herein is primarily directed toward application of the accessory to a speedometer with a radar detector as a secondary device to which the signal is provided by the accessory, but it will be understood that the accessory of the invention has applicability to similar analog metering devices and may increase the usefulness of secondary devices that accept a signal from the accessory of the invention.

Figure 1:
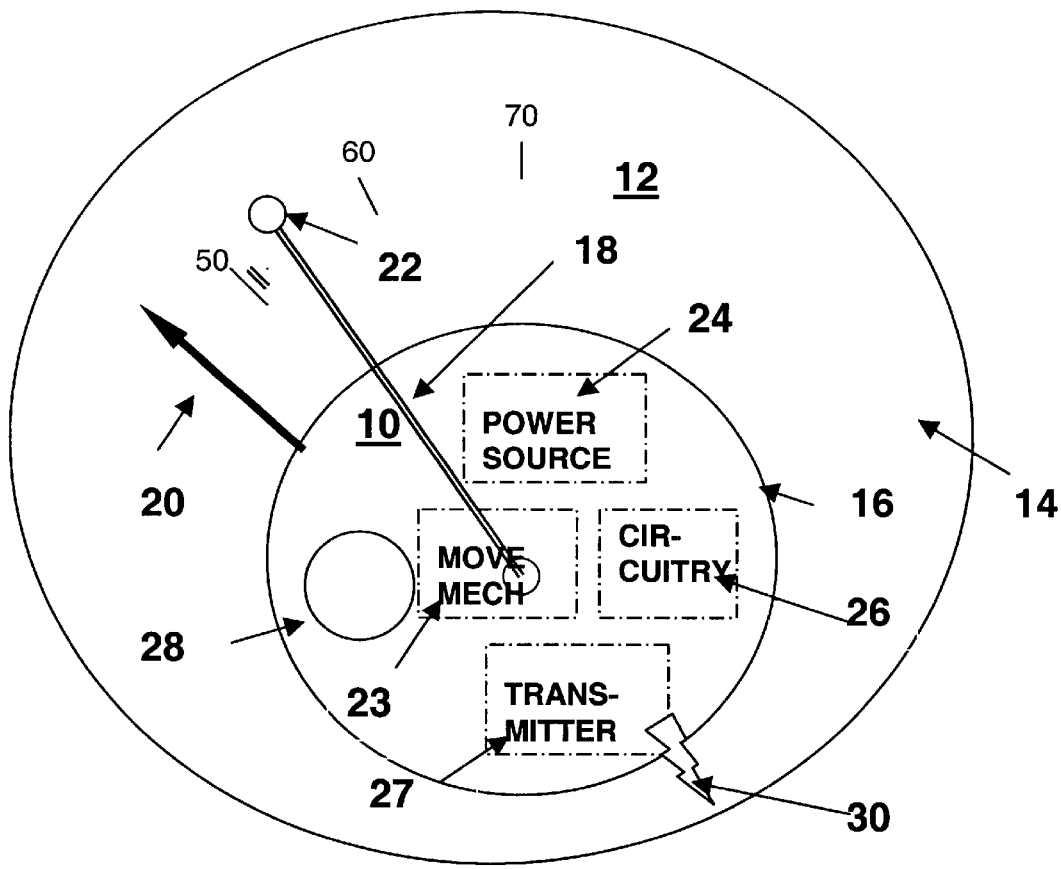
FIG. 1 is a schematic diagram for illustrating the accessory of the present invention and a secondary device.

Referring to FIG. 1, an accessory 10 of the invention is shown affixed to a speedometer 12. The speedometer 12 includes a clear cover 14. The accessory 10 includes a housing 16 that attaches, through adhesive, Velcro, or other suitable means, to a portion of the clear cover 14 without obscuring indicia used on a face of the speedometer 12 to indicate speed. However, a suction cup is a preferred method for attachment of the housing 16 to the cover 14. The suction cup will adhere the housing 16 to the cover 14, while providing simple means for attachment, removal, and adjustment of the accessory 10. The indicia on the speedometer 12 will typically include numbers and large and small gradation marks. Large gradation marks are often associated with speeds such as 50, 60, 70, 80 mph, etc., while smaller gradation marks typically equally divide the space between the larger gradation marks by 10, for example.

The accessory 10 of the preferred embodiment includes an arm 18 that extends away from the housing 16 in a fashion which makes it alignable with a plurality of gradation marks on the speedometer 12, or other similar analog metering device. The arm 18 is rotatably mounted as shown in FIG. 1 due to the nature of the particular speedometer 12 shown in FIG. 1. The exact nature of movement given the arm 18, or other similar member, will depend upon the nature of the particular metering device to which it attaches. For example, it is contemplated that a sliding member may be used to align with gradation marks of analog metering devices having a more rectilinear movement of a needle 20 that indicates the measured output of the metering device. The arm 18, or other suitable member, must be alignable with a plurality of the gradation marks with which the needle 20 aligns with. The purpose of the member 18 is to carry a sensor 22 relied upon to detect when the needle 20 aligns with the sensor 22.

Another preferred embodiment has an optional mechanism 23 to accomplish movement of the arm 18, or other similar member. The mechanism of movement could be an electric motor or solenoid or other device. The movement could be controlled by an operator using a wired or wireless remote control. This is especially useful in the preferred speedometer add-on accessory. As compared to a manually adjustable arm, the optional mechanism 23 actuated by a remote control removes the need for an operator reach forward to move the arm to adjust to different driving conditions and speed limits. However, remote control through the mechanism 23 has applicability in other environments to effectuate, for example, control of an add-on accessory of the invention from afar of its installed location. The movement 23 could also be controlled by another computer controlled device. This device would send control signals to the add-on accessory of the invention through a wired or wireless means. In the preferred case of an add-on accessory for a speedometer, the add-on accessory could be made aware of speed limits by automatic remote wireless means such as a short range RF signal. The add-on accessory could pick up this signal and automatically adjust the sensor arm 18 to the speed limit. This may be preferable to direct control of vehicle speed as proposed, for example in Thakker U.S. Pat. No. 6,246,948, which is incorporated by reference herein, as operator control is allowed. However, the basic signaling of recommended speed for operation can be the same as in the Thakker invention. Using the add-on accessory to sense transmitted speed limit information, as provided in the Thakker invention, also allows easy use of the speed limit information for vehicles not originally equipped with the ability to sense or make use of the speed limit information.

The sensor 22 on the arm 18 is a small and low power sensor typically requiring no more than a couple of volts to operate. The sensor may be optical, it may be a motion sensor, or other type of sensor capable of detecting alignment of the needle 20 with the sensor 22. Signals from the sensor 22 and power to the sensor 22 are preferably communicated through wires which can be disposed in the arm 18 if it is hollow or includes a suitable slot for accepting the wires.

Power is supplied to the sensor by a power source 24 preferably included in the housing 16. The power source 24 may comprise, for example, small size batteries. The cover 16 may include a removal panel for placement and replacement of the batteries. Common batteries, e.g., size AAA, are preferable to special purpose batteries such as those used in organizers, watches and calculators. Signaling from the sensor 22 is to circuitry 26 for signaling by a transmitter 27 to a secondary device, such as a central monitoring system or a radar detector. The signaling may also be used for driving an indicator, such as an audible speaker 28. The circuitry 26 may be simple driving circuitry, or may comprise control electronics to control the indicator 28 in any desirable manner responsive to the sensor 22. The indicator 28 alternatively may comprise a visual indicator, but a visual indication should be prominent enough to catch an operator's attention without requiring a direct look at the accessory 10 or speedometer 12.

The sensor 22 is preferably sensitive enough to detect when the needle 20 is aligned with a particular gradation of the speedometer 12. Less sensitive tolerances are possible, but then the accessory 10 will only be capable of detecting when the needle 20 enters a particular range, such as a 2 or 5 mph speedometer range, as opposed to a single mph indicated by a single gradation on the face. It is also preferable to have the sensor 22 adjustable through a significant range of the needle 22, such as 90%, to provide a wide range of settings at which an alarm indication will be given.

The signaling to a secondary device such as a radar detector or central monitoring system is preferably by a wireless communication making the transmitter 27 a wireless transmitter, e.g. a Bluetooth interface, as represented in FIG. 1 through a wireless communication 30. Wired transmissions are also possible, however. The wireless signal may be sonic, RF (radio-frequency), infrared, optical or any other wireless mode. Conventional devices incorporating conventional wireless communication protocols may be used by accessory 10 and a secondary device, such as a radar detector 32. Because the signal may be a very simple binary indication of the state of the sensor 22 any wireless or wired method to indicate that the sensor indicates a "positive", is sufficient. Thus, for example, the alarm signal of the accessory 10 produced by the audible indicator 28 forms an audible signal that could be used by a secondary device having the capability to detect the audible signal. In other cases, the signal understood by the secondary device will be separate from the optional alarm signal audibly produced by the accessory 10.

Figure 2:
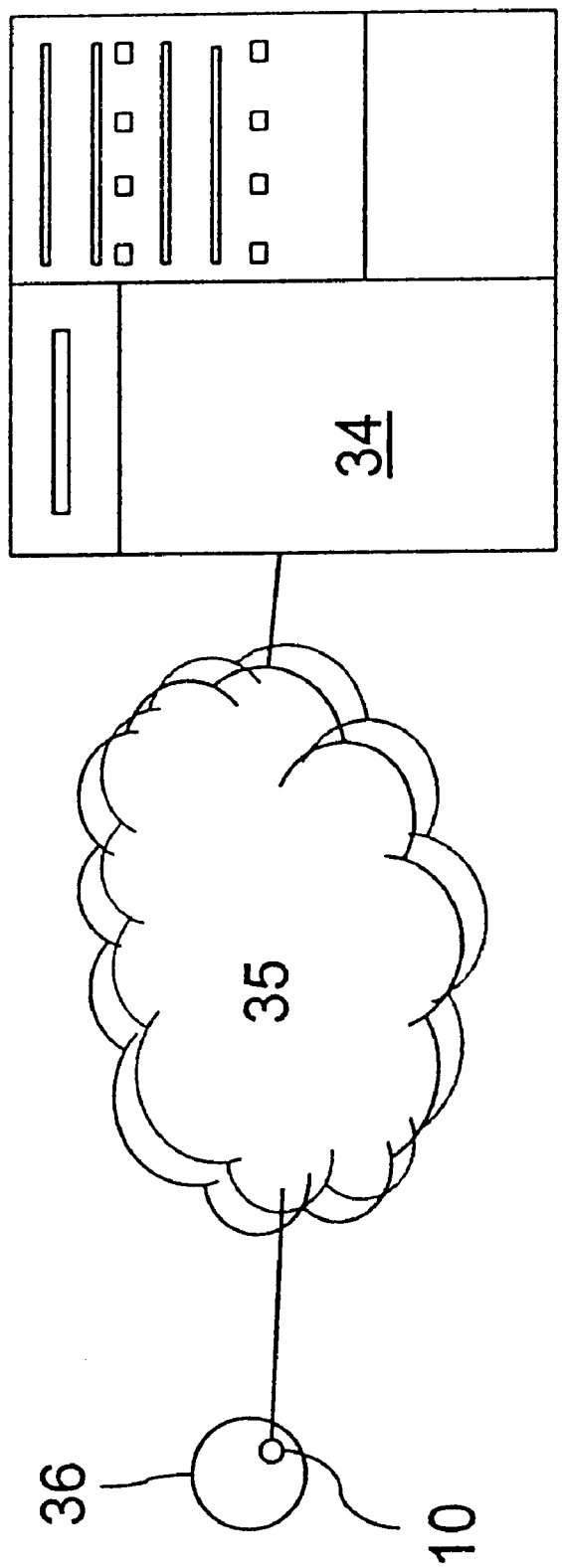
FIG. 2 is a schematic diagram showing the accessory of FIG. 1 used with a central monitoring system.

Other signaling methods permit the secondary device to be more remote than would be permitted by the sonic signal in the form of the audible alarm. The secondary device, in the form or a central monitoring system that might be used to monitor an accessory of the invention attached to an industrial analog meter, for example, that may be remote from the analog meter. This is generally represented in FIG. 2, showing a central monitoring system 34 that receives a signal from an add-on accessory 10 of the invention attached to an industrial meter 36. In the preferred embodiment of FIG. 2, the central monitoring system 34 and the add-on accessory 10 are connected via a wired network 35.

Figure 3:
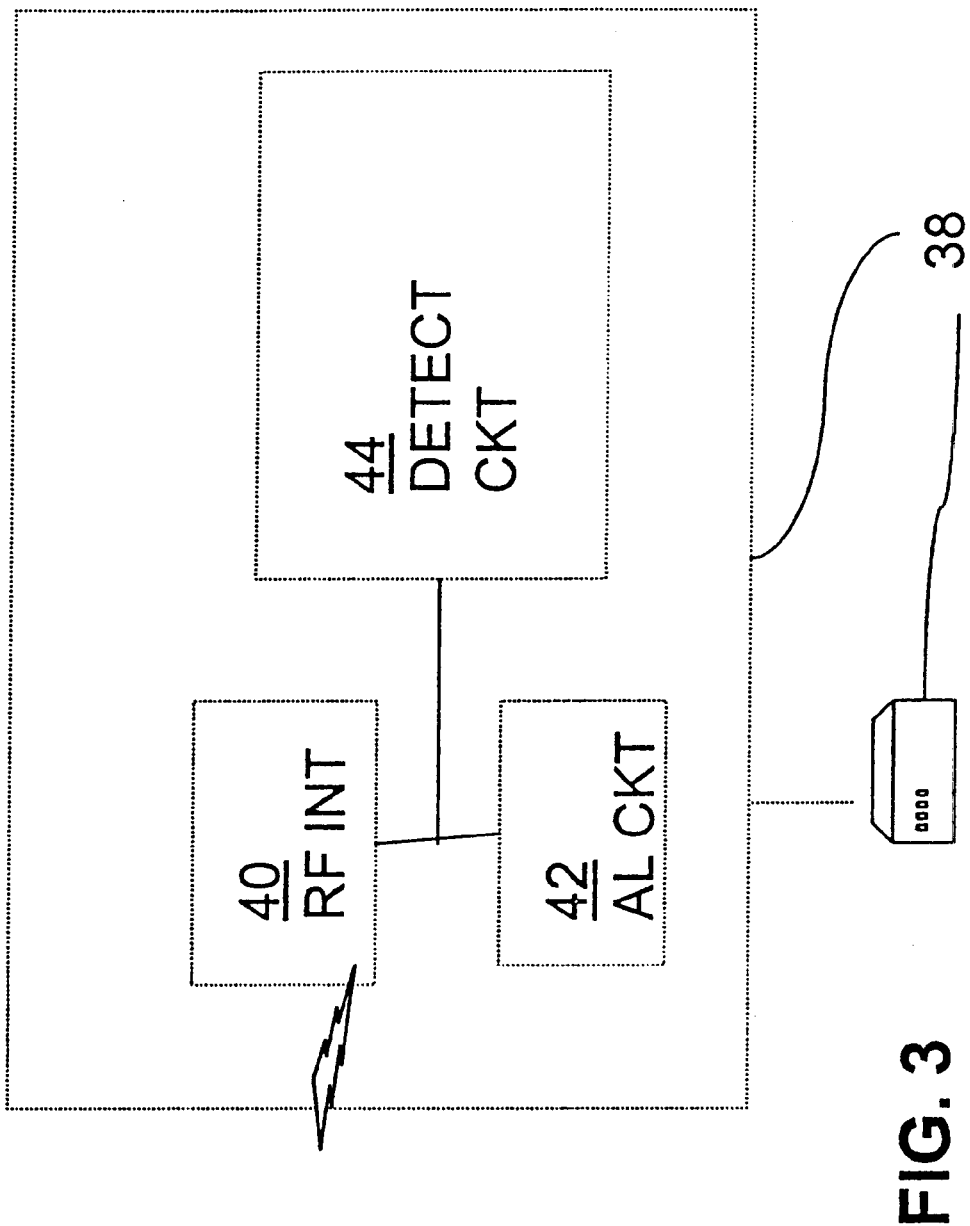
FIG. 3 is a schematic diagram of the accessory of FIG. 1 and a radar detector responsive to a signal of the accessory.
Figure 3:
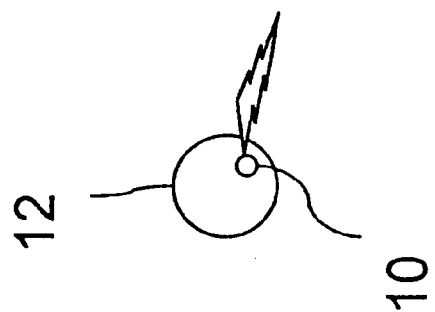

FIG. 3 schematically represents a preferred operation of the invention, where an add-on accessory signals to a radar detector 38. The radar detector, for example, includes a receiver in the form of an RF interface 40 for accepting the signal from the add-on accessory. In general, the radar detector 38 uses the signal to effect a modified operation where some functions of the radar detector are responsive to the signal of the accessory. The radar detector is conventional, but is modified to use the signal to, for example, enable its alarm response from an alarm circuit 42 or enable its detection function from a detection circuit 44, both of which may conserve the power source of a radar detector that may use an expendable source, i.e., batteries. Alternately, the alarm circuit 42 and the detection circuit and other circuits may only function when the signal is received. Enabling the alarm response from alarm circuit 42 permits the detector to alarm only when vehicle is above set speed and vulnerable to ticketing. This can eliminate annoying alarms when car is below target speed. Enabling the detection function of the detection circuit 44 reduces susceptibility to VG-2 detection. (VG-2 detection refers to the devices police use to detect radar detectors).

Thus, the invention provides a removable and self-contained add-on accessory for a metering device that provides a convenient indication when a particular output of the analog metering device has been reached. An operator need not have his or her visual attention directed to the metering device. Instead, a notification is provided when a selected output has been reached. The selected output is adjustable without removing the accessory of the invention, allowing an operator to change the point of output when a notification is provided.

In addition, the invention provides improved secondary devices such as radar detectors and central monitoring systems. The secondary devices accept the signal from an add-on accessory of the invention. This function results in, for example, an improved radar detector that can have either or both of its alarm and detection functions enabled by the signal provided from the add-on accessory.

These and other advantages of the invention will be apparent to those skilled in the art. While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A self-contained add-on accessory for an analog metering device having a moving needle as an indicator of a measured output parameter, the accessory comprising:

a housing dimensioned to fit on a portion of a cover of the analog metering device without obscuring gradation marks on a face of the analog metering device;

a selectively adjustable member extending from the housing and alignable with a plurality of different gradation marks on the face of the analog metering device;

a sensor mounted in associated with said selectively adjustable member to detect when an output needle of the analog metering device reaches a gradation on the face of the analog device with which said selectively adjustable member has been aligned;

a transmitter for producing a signal in response to the sensor and transmitting the signal to a secondary device;

a power source within said housing for powering said sensor and said transmitter.

2. The accessory of claim 1, further comprising an indicator associated with said housing, powered by said power source and responsive to said sensor.

3. The accessory of claim 2, wherein said indicator comprises an audible indicator.

4. The accessory of claim 1, wherein said sensor is mounted near a terminal end of said selectively adjustable member.

5. The accessory of claim 1, wherein said sensor comprises an optical sensor.

6. The accessory of claim 1, wherein said sensor comprises a motion sensor.

7. The accessory of claim 1, wherein said sensor has a limited detection range which approximately encompasses a single gradation of the analog metering device.

8. The accessory of claim 1, wherein the transmitter comprises a wireless transmitter.

9. The accessory of claim 8, further comprising an indicator responsive to said sensor, powered by said power source and mounted by said mount for indicating alignment of the needle with said sensor.

10. The accessory of claim 1, wherein the transmitter comprises a wireless transmitter.

11. The accessory of claim 1, further comprising a mechanism to move said selectively adjustable member.

12. The accessory of claim 11, wherein said mechanism is responsive to a remote control.

13. The accessory of claim 11, wherein said mechanism is responsive to a wireless information signal.

14. The accessory of claim 11, wherein the wireless information signal is a speed limit information signal.

\* \* \* \* \*